United States Patent [19]

Schaeftlmeier et al.

[11] Patent Number: 5,233,249

[45] Date of Patent: Aug. 3, 1993

[54] ELECTRICAL MACHINE, ESPECIALLY ALTERNATOR FOR MOTOR CARS

[75] Inventors: Roland Schaeftlmeier, Winnenden; Gerhard Pflueger, Markgroeningen; Bernhard Fakler, Esslingen; Klaus-Georg Buerger, Markgroeningen; Albrecht Knorpp, Murr, all of Fed. Rep. of Germany

[73] Assignee: Robert Bosch GmbH, Stuttgart, Fed. Rep. of Germany

[21] Appl. No.: 828,946

[22] PCT Filed: May 8, 1991

[86] PCT No.: PCT/DE91/00378

§ 371 Date: Feb. 5, 1992

§ 102(e) Date: Feb. 5, 1992

[87] PCT Pub. No.: WO91/19346

PCT Pub. Date: Dec. 12, 1991

[30] Foreign Application Priority Data

Jun. 6, 1990 [DE] Fed. Rep. of Germany ....... 4018090

[51] Int. Cl.⁵ .............................................. H02K 7/20
[52] U.S. Cl. ..................................... 310/112; 310/65; 310/254
[58] Field of Search ............... 310/54, 58, 64, 65, 310/43, 179, 71, 184, 112, 254, 116

[56] References Cited

U.S. PATENT DOCUMENTS

| | | | |
|---|---|---|---|
| 1,584,502 | 11/1926 | Apple | 310/112 |
| 3,758,799 | 11/1973 | Dochterman et al. | 310/89 |
| 3,783,313 | 1/1974 | Mathur | 310/112 |
| 4,785,213 | 11/1988 | Satake | 310/116 |
| 4,920,293 | 4/1990 | Kanda | 310/116 |

FOREIGN PATENT DOCUMENTS

| | | | |
|---|---|---|---|
| 0062706 | 10/1982 | European Pat. Off. | 310/112 |
| 0231785 | 8/1987 | European Pat. Off. | 310/112 |
| 8915212 | 10/1990 | Fed. Rep. of Germany | 310/112 |
| 2218675 | 9/1974 | France | 310/112 |

OTHER PUBLICATIONS

Patent Abstracts of Japan vol. 10, No. 27 (E-378) (2084) 4 Feb. 1986.

Primary Examiner—Steven L. Stephan
Assistant Examiner—Matthew Nguyen
Attorney, Agent, or Firm—Michael J. Striker

[57] ABSTRACT

An electrical machine has a surface-cooled stator having two stator plate stacks provided with slots and two stator windings arranged one after the other in an axial direction and inserted in the slots of the stator plate stack, a drive shaft, two pole systems cooperating with the stator windings, a metal housing arranged so that winding ends of the stator windings project outwardly beyond the metal housing and the two plate stacks are enclosed by the metal housing and fitted in the latter so as to conduct heat. The two stator plate stacks are offset relative to one another by half a slot spacing and, together with the winding ends of the stator windings are embedded in heat conducting plastic to form a prefabricated construction unit.

10 Claims, 2 Drawing Sheets

ELECTRICAL MACHINE, ESPECIALLY ALTERNATOR FOR MOTOR CARS

BACKGROUND OF THE INVENTION

The present invention relates to an electrical machine, preferably a three-phase generator for motor vehicles. More particularly, the present invention relates to an electrical machine which has a surface-cooled stator with two stator windings inserted in slots of a stator plate stack.

It is already known from the Japanese Utility Model Publication 57-65570 to provide the stator housing of an electric motor with cooling fins for guiding off heat. These cooling ribs, together with the annular spaces at the winding ends of the stator winding, are filled with a heat conducting mold resin after the stator plate stack has already been inserted into the housing with the stator winding. In so doing, the winding ends are completely embedded in the mold resin so that the heat losses generated in them can be guided outward. A disadvantage of an electrical machine produced in this way consists in that the entire prefabricated stator, including its housing, must be inserted in a press or injection mold for embedding the winding ends in heat conducting plastic, which requires special steps for sealing the injection or press mold. Such a solution becomes even more costly when the electrical machine has two stator plate stacks with stator windings located one after the other in the axial direction and when these systems are inserted into a pot-shaped stator housing in addition.

Such a three-phase generator for motor vehicles having a double-generator system in a closed, water-cooled housing is known (FIG. 5) from DE-OS 31 28 081 (R. 6932, FIGS. 5 to 7). The winding ends of the two systems are exposed. Consequently, due to the relatively poor heat conduction at the winding ends, the output of such an electrical machine is limited and its outer diameter is relatively large. Moreover the two stator plate stacks are inserted into the cylindrical stator housing from both sides, which cannot be realized in a pot-shaped construction of the housing.

SUMMARY OF THE INVENTION

The object of the present invention is to produce and assemble the stator in surface-cooled electrical machines having two stator systems located one after the other in the axial direction with good heat conduction and in a compact construction as inexpensively as possible.

In keeping with these objects and with others which will become apparent hereinafter, one feature of the invention resides, briefly states, in an electrical machine in which two stator plate stacks are positioned so as to be offset relative to one another by half a slot spacing and, together with the winding ends of the stator windings, are embedded in a heat conducting plastic to form a pre-fabricated constructional unit.

The electrical machine according to the invention has the advantage that the two stator systems are manufactured beforehand to form a constructional unit in a press mold by the heat conducting plastic in which the winding ends of the stator windings are embedded. A cylindrical or pot-shaped housing which is likewise manufactured beforehand can then be shrunk on to this constructional unit so that costly press molds or assembly devices can be dispensed with. Since the plastic and the stator plate stacks are located along the surface area of the inner surface of the machine housing, a good heat conduction from the winding ends to the housing is ensured. Another advantage consists in that the ripple of the d.c. voltage is considerably reduced by the stator plate stacks of the two generator systems in a parallel connection of the rectified generator voltages, the stator plate stacks being offset relative to one another by half a slot spacing.

In a particularly advantageous manner a heat conducting spacer ring having recesses, e.g. grooves, at its front sides is inserted as spacing means between the two plate stacks. Projections, e.g. positioning pins, arranged at the facing front sides of the stator plate stacks for the purpose of positioning engage in these grooves. For positioning the stator plate stacks the grooves at one front side of the spacer ring are advisably offset relative to the grooves at the opposite front side by a half slot spacing of the stator slots. An improved heat conduction from the outer winding ends can be achieved in that the outer winding ends of the two stator windings are widened beyond the slot base diameter of the slots in the stator plate stacks by stamping so that they are arranged as close as possible to the housing wall.

In machines with a pot-shaped housing and a connection of the two stator systems on the drive side (A side) a compact construction with the shortest possible paths for heat conduction in the radial direction can be achieved in that the connection lines of the rear (B-side) stator winding are guided through the slots of the front (A-side) stator plate stack to connection parts at the front side of the stator. The four connection lines of the rear stator windings, which are in a star connection, are advisably guided through four different slots of the front stator plate stack. Finally, the connection lines of the stator winding are advantageously welded to the front side of the front (A-side) winding end with connection parts which are anchored in the heat conducting plastic in which the winding ends are embedded.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 shows the prefabricated constructional unit according to

FIG. 2 in a top view from the front, partly broken away.

DESCRIPTION OF THE PREFERRED EMBODIMENT

Figure 1:
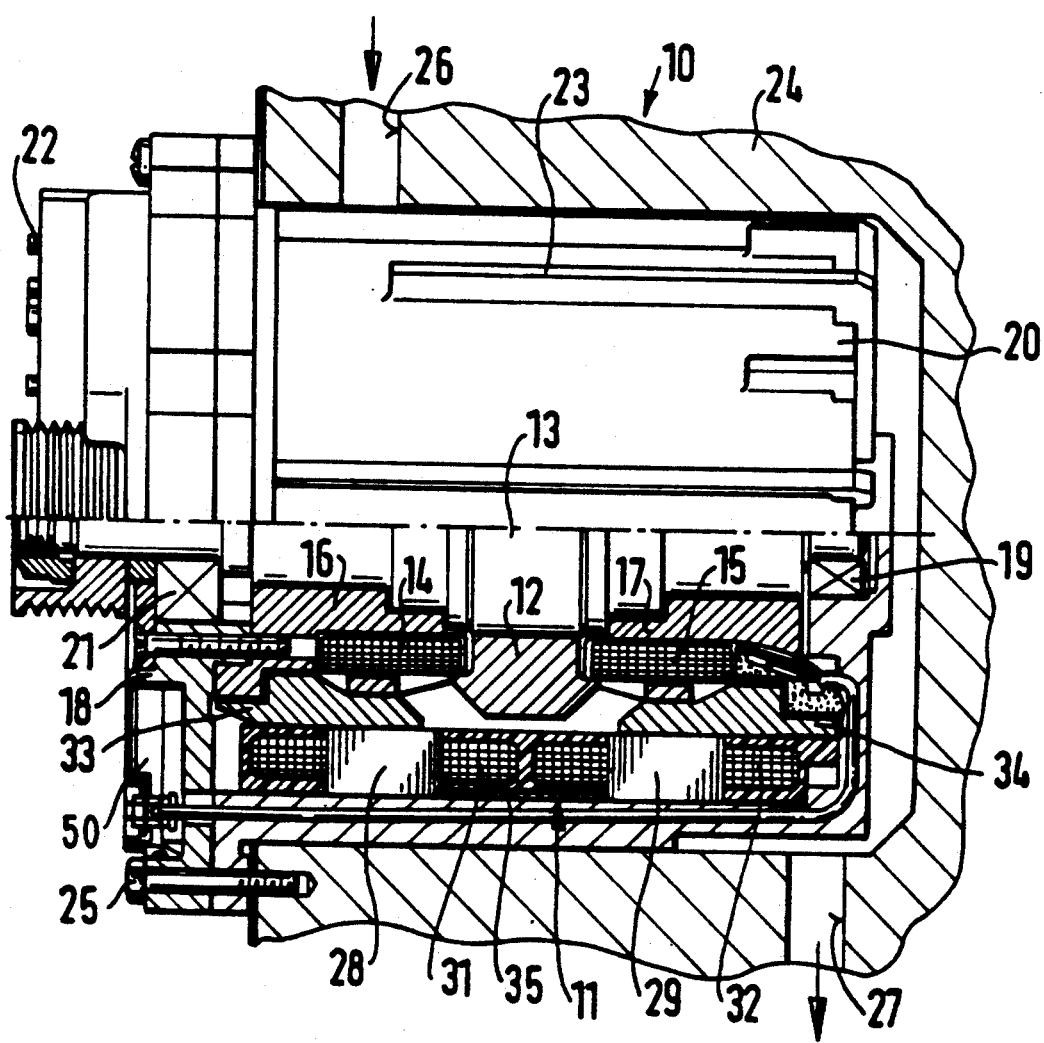
FIG. 1 shows a three-phase generator for motor vehicles with two generator systems, partially in cross section.

The three-phase generator designated by 10 in FIG. 1 serves as power supply for motor vehicles with a high energy requirement, construction machines and the like. It has a stator 11, a double-conducting piece rotor 12 in claw pole construction fastened on a drive shaft 13, and two exciter windings 14, 15 which are arranged on two pole rings 16, 17 and fastened at the metal housing 20 or at a front bearing cover 18. The drive shaft 13 is received in the base of a pot-shaped metal housing 20 of the generator 10 by its rear end via a ball bearing 19. The drive shaft 13 is received on the drive side via another ball bearing 21 in the bearing cover 18 which closes the metal housing on the drive side and carries the electrical connections 22 of the three-phase generator 10 and a rectifier 50 and regulator arrangement, not shown. The liquid-cooled three-phase generator 10 is provided with spacer ribs 23 outside at the metal housing 20 and is inserted—as is shown—in a correspondingly shaped pot-shaped recess in the drive unit 24 of the vehicle and fastened at the latter by screws 25. The coolant is guided to the outer surface of the metal housing 20 via an inlet bore 26 to absorb the heat generated in the generator 10 and to guide off into the cooling circuit of the machine via an outlet bore 27.

The stator 11 of the three-phase generator 10 contains two stator plate stacks 28, 29 which are situated one after the other in the axial direction, the stator windings 31, 32 being inserted in the slots 30 of the latter and connected in a star connection. The stator windings 31, 32 cooperate with the double-conducting piece rotor 12 which has two claw pole systems 33, 34. The two stator plate stacks 28 and 29 are kept at a distance from one another by a metal spacer ring 35 and positioned so as to be offset relative to one another by a half slot spacing. They are embedded along with the winding ends 31a, 31b and 32a, 32b of the stator windings 31 and 32 in a heat conducting plastic 36 to form a prefabricated constructional unit 37.

Figure 2:
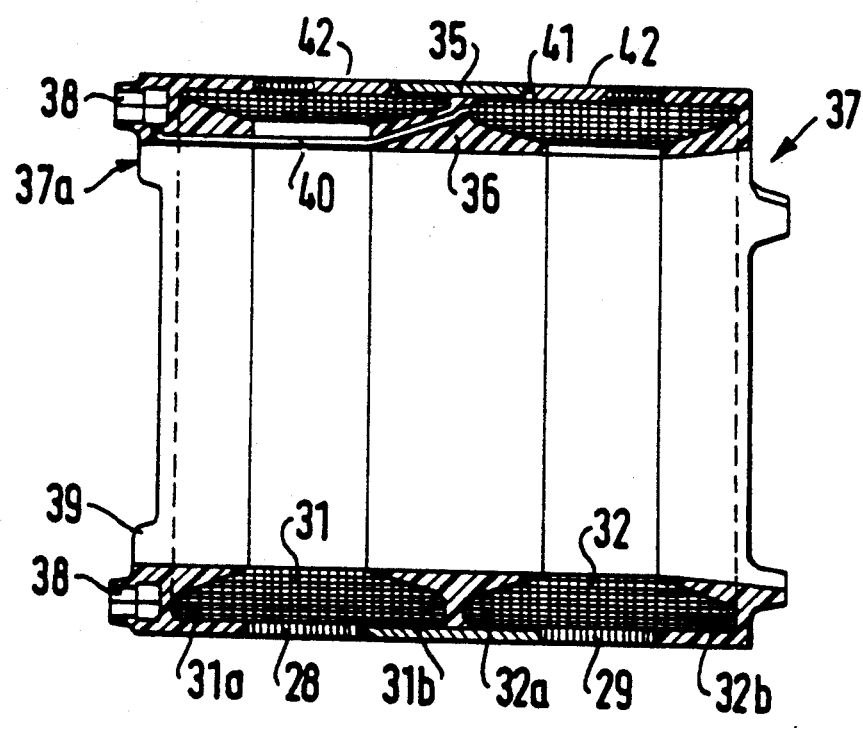
FIG. 2 shows a prefabricated constructional unit having two stator plate stacks, their stator windings, a spacer ring situated between the latter and its embedment in the heat conducting plastic in cross section.
Figure 3:
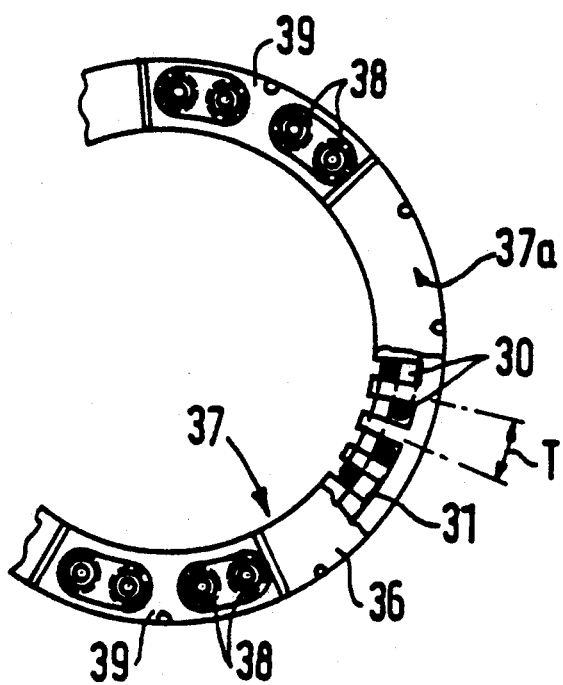

FIGS. 2 and 3 show this prefabricated constructional unit 37 in which a polyester resin combined with glass fiber as heat conducting plastic is pressed in liquid state around the winding ends of the stator windings 31 and 32 in a heated press mold. In order to improve the heat conduction at the pot-shaped metal housing 20, the two outer winding ends 31a and 32b of the two stator windings 31, 32 are expanded beyond the slot base diameter of the slots 30 in the stator plate stacks 28, 29 by stamping so that they can come to rest as close as possible under the inner surface of the cooled metal housing 20 after being inserted in the metal housing 20.

It can be seen from FIG. 3 that the winding connections of the two stator windings 31 and 32 at the front side 37a of the prefabricated constructional unit 37 are arranged in two groups located opposite one another in which four connection parts 38 in the form of threaded sockets are embedded in corresponding collar-shaped projections 39 of the heat conducting plastic 36 in which the winding ends are embedded. It can be seen from FIG. 3 that the slots 30 of the stator plate stacks 28 and 29 are filled only halfway by a phase conductor of the respective stator winding 31, 32 so that all connection lines of the rear (B-side) stator winding 32 are guided through the slots 30 of the front (A-side) stator plate stack 28 to the connection parts 38 at the front side 37a of the constructional unit 37, as shown in FIG. 2 for a connection conductor 40. The connection lines 40 of the two stator windings 31, 32 have been welded at the front side of the front winding end 31a with the connection parts 38 before the latter were enclosed in the projections 39 by the heat conducting plastic 36.

Figure 4:
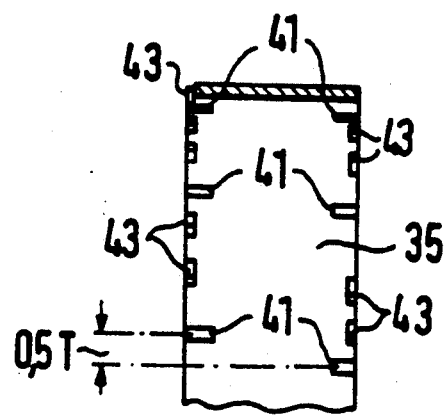
FIG. 4 shows the spacer ring.

It can be seen from FIG. 4 that the spacer ring 35 inserted between the two stator plate stacks 28 and 29 has a plurality of recesses in the form of grooves 41 at its two front sides. The positioning pins 42 which are pressed into corresponding bore holes of the stator plate stacks 28, 29 so as to be symmetrically arranged engage in the grooves 41 for positioning the stator plate stacks 28 and 29. Since the stator plate stacks 28 and 29 are held together, moreover, by a plurality of rivets, not shown, which are distributed along the circumference, correspondingly arranged recesses 43 are cut out at the two front sides of the spacer ring 35 and rivet heads of the plate stack rivets project into these recesses 43. Finally, it can also be seen from FIG. 4 that the grooves 41 at one front side of the spacer ring 35 are offset relative to the grooves 41 at the opposite front side by half a slot spacing (0.5 T) of the stator slots 30. Accordingly, in a parallel connection of the rectified voltages in the stator windings 31 and 32 the ripple of the d.c. voltage is reduced.

It will be understood that each of the elements described above, or two or more together, may also find a useful application in other types of constructions differing from the types described above.

While the invention has been illustrated and described as embodied in an electrical machine, especially alternator for motor cars, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electrical machine formed as a three phase generator and, comprising a rectifier; a surface-cooled cooled stator having two stator plate stacks provided with slots and two stator windings arranged one after the other in an axial direction and inserted in said slots of said stator plate stacks; a drive shaft; two pole systems cooperating with said stator windings; a metal housing arranged so that winding ends of said stator windings project outwardly beyond said metal housing and said two plate stacks are enclosed by said metal housing and fitted in said metal housing, said two stator plate stacks being offset relative to one another by half a slot spacing and, together with said winding ends of said stator windings being embedded in heat conducting plastic to form a prefabricated constructional unit; spacing means for providing a distance between said two stator plate stacks; and means for positioning said two stator plate stacks relative to one another and including first formation means provided on said spacing means and second formation means on sides of said stator plate stacks and cooperating with said first formation means.

2. An electrical machine as defined in claim 1, wherein said pole systems are claw pole systems and each includes an exciter winding.

3. An electrical machine as defined in claim 1; and further comprising bearings at front sides of the machine for receiving said drive shaft.

4. An electrical machine as defined in claim 1, and further comprising a plurality of positioning pins arranged so as to be distributed at a front side of said stator plate stacks and engaging in said grooves at the front sides of said spacer ring.

5. An electrical machine as defined in claim 4, wherein the grooves at one front side of said spacer ring are offset relative to the grooves at the opposite front side of said spacer ring by a half slot spacing of the stator slots.

6. An electrical machine as defined in claim 1, wherein said winding ends of said two stator windings are widened to have a width exceeding a slot base diameter of said slots in said stator plate stacks.

7. An electrical machine as defined in claim 1; and further comprising a pot-shaped metal housing; connection lines at a rear one of said stator windings; connection parts provided at a front side of said stator, said connection lines of said rear stator winding being located in said pot-shaped metal housing and guided through said slots of a front one of said stator plate stacks to said connection parts at the front side of said stator.

8. An electrical machine as defined in claim 7, wherein said connection lines include four connection lines of said rear stator winding which are arranged in a star connection and guided through four said slots of said front plate stack.

9. An electrical machine as defined in claim 7, wherein said connection lines of said two stator windings are welded at a front side of a front one of the front winding ends with said connection parts which are anchored in said heat conducting plastic in which said winding end is embedded.

10. An electrical machine as defined in claim 1, wherein said spacing means includes a heat conductive spacer inserted between said two stator plate stacks and provided with grooves at its front sides, and projections arranged at facing sides and engaging in said grooves to position said stator plate stacks.

* * * * *